United States Patent
Wasylenko et al.

(10) Patent No.: US 12,318,985 B2
(45) Date of Patent: Jun. 3, 2025

(54) POLYMER EXTRUSION PROCESS

(71) Applicant: NOVA Chemicals (International) S.A., Fribourg (CH)

(72) Inventors: Derek Wasylenko, Calgary (CA); P. Scott Chisholm, Calgary (CA); Tony Tikuisis, Calgary (CA); Norman Aubee, Okotoks (CA); Fraser Waldie, Calgary (CA); Douglas Checknita, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 156 days.

(21) Appl. No.: 17/919,987

(22) PCT Filed: Apr. 26, 2021

(86) PCT No.: PCT/IB2021/053417
§ 371 (c)(1),
(2) Date: Oct. 19, 2022

(87) PCT Pub. No.: WO2021/220134
PCT Pub. Date: Nov. 4, 2021

(65) Prior Publication Data
US 2023/0202089 A1    Jun. 29, 2023

Related U.S. Application Data

(60) Provisional application No. 63/017,089, filed on Apr. 29, 2020.

(51) Int. Cl.
*B29C 48/30* (2019.01)
*B29C 48/00* (2019.01)
*B29K 105/00* (2006.01)

(52) U.S. Cl.
CPC ...... *B29C 48/3003* (2019.02); *B29C 48/0018* (2019.02); *B29K 2023/06* (2013.01); *B29K 2105/0094* (2013.01)

(58) Field of Classification Search
CPC ............................. B29C 48/3003; B29C 48/32
See application file for complete search history.

(56) References Cited

U.S. PATENT DOCUMENTS

| | | | |
|---|---|---|---|
| 3,125,547 | A | 3/1964 | Blatz |
| 3,222,314 | A | 12/1965 | Wolinski |

(Continued)

FOREIGN PATENT DOCUMENTS

| | | |
|---|---|---|
| EP | 0 217 585 A2 | 4/1987 |
| WO | WO-96/31562 A1 | 10/1996 |
| WO | WO-00/69967 | 11/2000 |

OTHER PUBLICATIONS

Prospector. Melt Mass-Flow and Melt Volume-Flow Rate—ASTM D1238. Online reference.*

(Continued)

*Primary Examiner* — Christopher T Schatz
(74) *Attorney, Agent, or Firm* — Thomas J. Styslinger, Reg. No. 75185

(57) ABSTRACT

In the manufacture of extruded polymers there are a number of surface defects referred to as sharkskin, snakeskin and orange peel which all generally relate to the rheology of the polymer melt. A severe form of surface defect is "melt fracture" which is believed to result when the shear rate at the surface of the polymer is sufficiently high that the surface of the polymer begins to fracture. That is, there is a slippage of the surface of the extruded polymer relative to the body of the polymer melt. The surface generally can't flow fast enough to keep up with the body of the extrudate and a fracture in the melt occurs generally resulting in a severe loss of surface properties for the extrudate. A polymer (Continued)

extension process is disclosed wherein these undesirable surface defects are eliminated.

6 Claims, 3 Drawing Sheets

(56) References Cited

U.S. PATENT DOCUMENTS

| | | |
|---|---|---|
| 4,013,622 A | 3/1977 | DeJuneas et al. |
| 4,540,538 A | 9/1985 | Corwin et al. |
| 4,855,360 A | 8/1989 | Duchesne et al. |
| 5,015,693 A | 5/1991 | Duchesne et al. |
| 5,550,193 A | 8/1996 | Chiu et al. |
| 2012/0258270 A1 | 10/2012 | Chang |

OTHER PUBLICATIONS

ASTM 1238-13, Standard Test Method for Melt Flow Rates of Thermoplastics by Extrusion Plastometer, May 24, 2019, 16 pages.
ASTM 972-16, Standard Test Method for Evaporation Loss of Lubricating Greases and Oils, Apr. 1, 2016, 5 pages.
International Search Report and Written Opinion mailed on Jul. 27, 2021 in corresponding international application PCT/IB2021/053417, 11 pages.

\* cited by examiner

POLYMER EXTRUSION PROCESS

CROSS-REFERENCE TO RELATED APPLICATIONS

This application is a U.S. National Phase Application under 35 U.S.C. § 371 of International Application No. PCT/IB2021/053417, filed Apr. 26, 2021, which claims priority to and the benefit of U.S. Provisional Application No. 63/017,089, filed Apr. 29, 2020, both of which are hereby incorporated by reference in their entireties.

TECHNICAL FIELD

This process relates to the extrusion of polymers (especially polyethylene) in the presence of a polymer process aid package comprising a fluoropolymer. More specifically, a "start-up protocol" is provided whereby the extrusion die is first treated with polyethylene glycol (before the polymer is added to the extruder) to reduce the time required for the extrusion process to provide "melt fracture free" film.

BACKGROUND ART

In the manufacture of extruded polymers there are a number of surface defects referred to as sharkskin, snakeskin and orange peel which all generally relate to the rheology of the polymer melt. A severe form of surface defect is "melt fracture" which is believed to result when the shear rate at the surface of the polymer is sufficiently high that the surface of the polymer begins to fracture. That is, there is a slippage of the surface of the extruded polymer relative to the body of the polymer melt. Interactions between the surface of the polymer and the metal surface of the die and/or extruder results in flow instabilities between the surface of the polymer and the body of the polymer melt. As a result, the surface of the polymer generally cannot flow fast enough to keep up with the body of the extrudate and a fracture in the melt occurs generally resulting in a severe deterioration of surface quality of the extrudate.

U.S. Pat. No. 3,125,547 issued Mar. 17, 1964 assigned to E.I. DuPont du Nemours and Company, discloses blends of polyethylene and small amounts of fluorocarbon polymers to provide a smooth surface on extrudate at high extrusion speeds.

U.S. Pat. No. 3,222,314 issued Dec. 7, 1965 assigned to E.I. DuPont du Nemours and Company, discloses blends of polyethylene and low molecular weight polyethylene glycol to provide heat sealable film suitable for printing.

U.S. Pat. No. 4,013,622 (DeJuneas et al.) teaches the use of low molecular weight polyethylene glycol to reduce the incidence of "breakdowns" during the manufacture of polyethylene film.

Similarly, U.S. Pat. No. 4,540,538 (Corwin et al.) teaches that pinstriping may be reduced during the extrusion of polyolefin film through the use of a combination of (i) low molecular weight polyethylene glycol; (ii) a hindered phenolic antioxidant; and (iii) a selected inorganic antiblock.

There are a series of patents in the name of the Minnesota Mining and Manufacturing Company relating to the use of a combination of polyalkylene oxides (which may be polyethylene glycol) and fluorocarbon polymers as a process aid in extrusion of polyolefins. These patents include U.S. Pat. Nos. 4,855,360 and 5,015,693.

SUMMARY OF INVENTION

In an embodiment, there is provided a process for the extrusion of a composition comprising:

a) polyethylene; and
b) a polymer process aid (PPA) comprising fluoropolymer in a blown film line comprising an extruder and an annular die, wherein polyethylene glycol having a number average molecular weight of from 300 to 10,000 g/mol is applied to said annular die prior to the addition of said composition to said extruder.

In an embodiment, the polymer process aid comprises a combination of fluoroelastomer and an interfacial agent and, in a related embodiment, the interfacial agent is polyethylene glycol.

In an embodiment, the polyethylene has a melt index, $I_2$, as measured by ASTM D1238 at 190° C., using a 2.16 kilogram load, of from 0.3 to 5 grams per 10 minutes and a density of from 0.900 to 0.935 grams per cubic centimeter (g/cc).

In an embodiment, the polyethylene is a copolymer of ethylene with at least one comonomer selected from the group consisting of butene, hexene and octene.

In an embodiment, there is provided a blown film made by the above described process.

DESCRIPTION OF EMBODIMENTS

Extrudable Polymer

Figure 1:
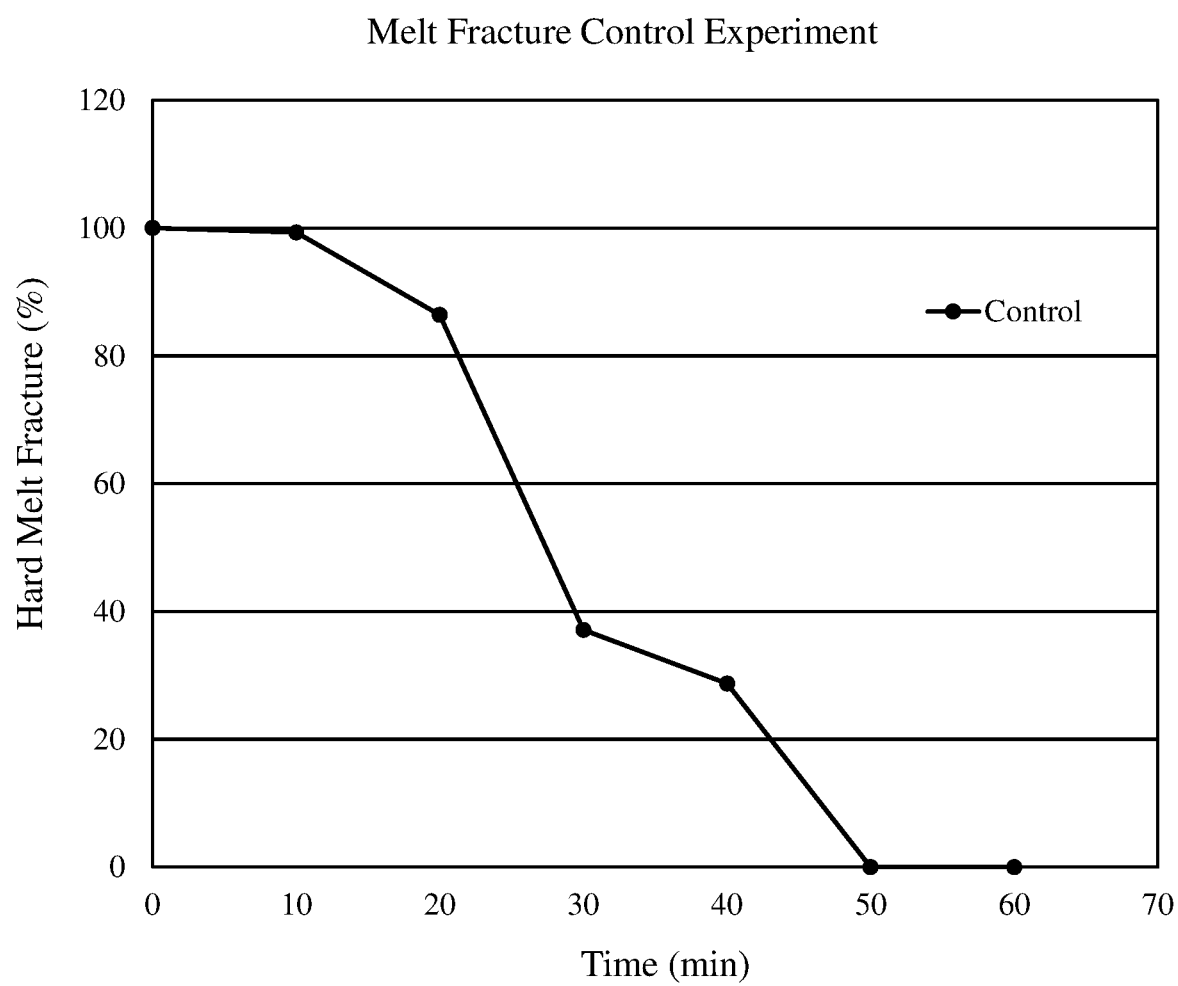
FIG. 1 shows a melt fracture clearing chart for a control sample: Melt Fracture Start-up resin was used to generate 100% melt fracture, and LLDPE-1 (containing 500 ppm PPA) was introduced at t=0.

The major or predominant component in the compositions used in present process is an extrudable polymer. The predominant component is present in an amount of at least about 98% by weight (weight %) of the base composition. That is, the composition may include pigments and fillers in a typical amount, but they would not be considered a part of the base component.

In an embodiment, the extrudable polymer is an olefin (co)polymer. Typically, the olefin polymer (or "polyolefin") comprises at least 85 weight % of one or more $C_{2-3}$ alpha olefins and up to 15 weight % of one or more $C_{4-8}$ alpha olefins. Preferably, the polyolefin is a polyethylene and comprises at least 90 weight % of ethylene and up to 10 weight % of one or more $C_{4-8}$ alpha olefins. Suitable $C_{4-8}$ alpha olefins include butene, 4-methyl pentene, hexene and octene.

The polyolefin may be prepared by any conventional polymerization process. The polymerization may be a gas phase process (conducted at relatively low pressures, e.g. below 500 psi, preferably below about 250 psi; at temperatures below about 130° C., and using a particulate catalyst in a fluidized bed to produce products such as high density polyethylene (e.g. having a density greater than 0.935, preferably greater than 0.940 g/cc) or linear low density polyethylene (having a density from about 0.900 to 0.935 g/cc); or the polymerization may be a solution phase process (a process at high temperatures typically from about 130 to about 250° C., preferably not greater than about 220° C., comprising dissolving ethylene and other comonomer(s) in a solvent such as hexane and adding a coordination catalyst;

or the polymerization may a slurry process conducted in the presence of a hydrocarbon diluent at temperature from about 5° C. to about 200° C. in the presence of a coordination catalyst; or the polymerization may be in a high pressure polymerization process (producing LDPE from about 0.917 to 0.930 g/cc) conducted at temperatures less than 350° C. using a free radicals as catalyst, e.g. oxygen or peroxides. The use of single site catalysts (including so-called metallocene catalysts and "constrained geometry catalysts") is also contemplated. The details of such types of catalysts and polymerizations are generally known to those skilled in the art.

The process is useful for thermoplastic polyolefins in general but is particularly well suited for improving the extrusion of linear polyethylene, especially linear low density polyethylene (or "LLDPE" having densities from about 0.9 to about 0.935 g/cc). As used herein, the term LLDPE refers to a copolymer of ethylene with another copolymerizable alpha olefin (such as the aforementioned butene, hexene or octene). Such LLDPEs are well known items of commerce and may be prepared by conventional polymerization processes.

LLDPE is often characterized by density and melt index, $I_2$. In an embodiment, the LLDPE has a density of from 0.900 to 0.935 grams per cubic centimeter, and a melt index, $I_2$, of from 0.3 to 5.0 grams/10 minutes (where $I_2$ is determined by ASTM D 1238 at 190° C., using a 2.16 kg weight and density is determined by ASTM D792.

Polyethylene Glycol

The present process uses at least one polyethylene glycol ("PEG") as an essential component.

Firstly, the PEG is applied to the extrusion die prior to the start of the extrusion process. In an embodiment, the PEG used in this stage of the process may have number average molecular weight of from about 300 to 10,000 g/mol (especially from about 400 to 9,000 g/mol). PEG having a number average molecular weight of less than 500 g/mol is typically liquid at room temperature and thus may be easily applied to the extruder die (for example, with a brush or cloth). PEG having a number average molecular weight of less than 5,000 g/mol melts at temperatures of less than 100° C. and thus may be applied as a solid onto a warm die (provided that the die is warm enough to melt the PEG, caution should be exercised when using a hot die as this may cause decomposition of the PEG). Alternatively, a combination of one or more PEG's with a liquid—in the form of a solution or dispersion—may be used. Water may be used for reasons of low cost and safety (in comparison to hydrocarbon solvents).

Secondly, the PEG may also be present in the fluoropolymer containing polymer processing aid (PPA) that is used in the extrusion process; in an embodiment, the number average molecular weight of the PEG that is used in the PPA is from about 3,000 to about 8,000 g/mol.

Fluorocarbon Polymer

The terms "fluorocarbon polymer" and "fluoropolymer" are meant to convey their conventional meaning, namely homopolymers and copolymers of fluorinated olefins.

The fluoropolymers useful in the present process include elastomeric fluoropolymers (i.e., fluoroelastomers or amorphous fluoropolymers) and thermoplastic fluoropolymers (i.e. semi-crystalline fluoropolymers). Fluoroelastomers useful in this invention are fluoropolymers that are normally in the fluid state at room temperature and above, i.e., fluoropolymers which have glass transition ($T_g$) values below room temperature and which exhibit little or no crystallinity at room temperature. It is preferred, but not essential, to employ fluoroelastomers having a fluorine to hydrogen ratio of at least 1:1.5. Fluorinated monomers which may be copolymerized to yield suitable fluoroelastomers include vinylidene fluoride, hexafluoropropylene, chlorotrifluoroethylene, tetrafluoroethylene and perfluoroalkyl perfluorovinyl ethers. Specific examples of the fluoroelastomers which may be employed include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride, all of which are known in the art.

Semi-crystalline fluoropolymers which may be used in the invention include, but are not limited to poly(vinylidene fluoride), homopolymers and copolymers of tetrafluoroethylene (such as TEFLON® FEP fluorocarbon resin, and copolymers of tetrafluoroethylene, propylene and, optionally, vinylidene fluoride).

Multimodal fluoropolymers, such as those disclosed in International Patent Publication WO 00/69967, may also be employed as the fluoropolymer in the compositions of this invention. By "multimodal" is meant that the fluoropolymer has at least two components of discrete and different number average or weight average molecular weights. Both components may be amorphous or semi-crystalline, or one component may be amorphous and another component semi-crystalline.

In an embodiment, the fluorocarbon polymer is a fluoroelastomer comprising vinylidene fluoride and hexafluoropropylene. Such fluoroelastomers are sold under the trademark VITON® by E.I. DuPont de Nemours and by Minnesota Mining and Manufacturing ("3M") under the trademark DYNAMAR®.

Polymer Process Aid (PPA)

As used herein, the term polymer process aid (PPA) refers to a composition comprising a fluoropolymer that is used to reduce the level of melt defect in an extrudable polymer. The PPA is incorporated into the extrudable polymer prior to or during the extrusion process to reduce melt defects/melt fracture. The use of such PPA is well known.

In an embodiment, the PPA contains an "interfacial agent" to improve the performance of the fluoropolymer. In an embodiment, the interfacial agent is PEG.

In an embodiment, the PPA contains the fluoropolymer and PEG in weight ratios of from 1:3 to 3:1. In an embodiment, the fluoropolymer is a fluoroelastomer; the PEG has a number average molecular weight of from 3,000 to 8,000 g/mol and the weight ratio of fluoropolymer to PEG is from 1:2 to 2:1. In an embodiment, the PPA was used in an amount of from 100 to 2,000 parts per million by weight, based on the weight of the extrudable polymer.

PPA compositions of this disclosure may also contain minor amounts of other ingredients commonly employed in process aids including, but not limited to partitioning agents, antioxidants, metal oxides, etc.

A process suitable for making the PPA compositions which contain PEG is one in which the fluoroelastomer and polyethylene glycol are combined in any order. For example, the fluoroelastomer, and polyethylene glycol may be pelletized, ground, or otherwise comminuted to a sufficiently small particle size so that these ingredients may be dry blended to form the final process aid composition. Ribbon blenders, V-cone blenders, tumble blenders, plough mixers, and the like are suitable for mixing such particulate ingredients. Alternatively, fluoropolymer may be ground to a sufficiently small particle size, and then mixed with PEG at a temperature such that the PEG is molten. The mixture may then be cooled and pelletized or granulated. Such mixing may take place in a twin screw extruder, a single screw extruder, a BANBURY® mixer, a FARREL® Continuous Mixer, or the like.

The PPA compositions used in this disclosure are useful in the extrusion of non-fluorinated melt processible polymers (especially polyethylene and most particularly LLDPE) for the manufacture of blown films. Typical PPA levels in LLDPE compositions are 100 to 2,000 ppm.

Additives

LLDPE is typically sold with an additive package that contains a primary antioxidant (part 1, below) and a secondary antioxidant (part 3, below). The primary antioxidant may be used in an amount of from 200 to 2,000 ppm. Similarly, the secondary antioxidant may also be used in an amount of from 200 to 2,000 ppm. Other (optional) additives are also described.

1. Primary Antioxidants 1.1 Alkylated Mono-Phenols

For example, 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(alpha.-methylcyclohexyl)-4,6 dimethylphenol; 2,6-di-octadecyl-4-methylphenol; 2,4,6,-tricyclohexyphenol; and 2,6-di-tert-butyl-4-methoxymethylphenol.

1.2 Alkylated Hydroquinones

For example, 2,6di-tert-butyl-4-methoxyphenol; 2,5-di-tert-butylhydroquinone; 2,5-di-tert-amyl-hydroquinone; and 2,6diphenyl-4-octadecyloxyphenol.

1.3 Hydroxylated Thiodiphenyl Ethers

For example, 2,2'-thio-bis-(6-tert-butyl-4-methylphenol); 2,2'-thio-bis-(4-octylphenol); 4,4'thio-bis-(6-tertbutyl-3-methylphenol); and 4,4'-thio-bis-(6-tert-butyl-2-methylphenol).

1.4 Alkylidene-Bisphenols

For example, 2,2'-methylene-bis-(6-tert-butyl-4-methylphenol); 2,2'-methylene-bis-(6-tert-butyl-4-ethylphenol); 2,2'-methylene-bis-(4-methyl-6-(alpha-methylcyclohexyl) phenol); 2,2'-methylene-bis-(4-methyl-6-cyclohexyiphenol); 2,2'-methylene-bis-(6-nonyl-4-methylphenol); 2,2'-methylene-bis-(6-nonyl-4methylphenol); 2,2'-methylene-bis-(6-(alpha-methylbenzyl)-4-nonylphenol); 2,2'-methylene-bis-(6-(alpha, alpha-dimethylbenzyl)-4-nonylphenol); 2,2'-methylene-bis-(4,6-di-tert-butylphenol); 2,2'-ethylidene-bis-(6-tert-butyl-4-isobutylphenol); 4,4'methylene-bis-(2,6-di-tert-butylphenol); 4,4'-methylene-bis-(6-tert-butyl-2-methylphenol); 1,1-bis-(5-tert-butyl-4-hydroxy-2-methylphenol)butane 2,6-di-(3-tert-butyl-5-methyl-2-hydroxybenzyl)-4-methylphenol; 1,1,3-tris-(5-tert-butyl-4-hydroxy-2-methylphenyl)butane; 1,1-bis-(5-tert-butyl-4-hydroxy2-methylphenyl)-3-dodecyl-mercaptobutane; ethyleneglycol-bis-(3,3,-bis-(3'-tert-butyl-4'-hydroxyphenyl)-butyrate)-di-(3-tert-butyl-4-hydroxy-5-methylpenyl)-dicyclopentadiene; di-(2-(3'-tert-butyl-2'hydroxy-5'methylbenzyl)-6-tert-butyl-4-methylphenyl) terephthalate; and other phenolics such as monoacrylate esters of bisphenols such as ethylidiene bis-2,4-di-t-butylphenol monoacrylate ester.

2. UV Absorbers and Light Stabilizers 2.1 2-(2'-hydroxyphenyl)-benzotriazoles

For example, the 5'-methyl-,3'5'-di-tert-butyl-,5'-tert-butyl-,5'(1,1,3,3-tetramethylbutyl)-,5-chloro-3',5'-di-tert-butyl-,5-chloro-3'-tert-butyl-5'-methyl-3'-sec-butyl-5'-tert-butyl-,4'-octoxy,3',5'-ditert-amyl-3',5'-bis-(alpha, alpha-di methylbenzyl)-derivatives.

2.2 2-Hydroxy-Benzophenones

For example, the 4-hydroxy-4-methoxy-,4-octoxy,4-decyloxy-,4dodecyloxy-,4-benzyloxy,4,2',4'-trihydroxy- and 2'-hydroxy-4,4'-dimethoxy derivative.

2.3 Sterically Hindered Amines

For example, bis (2,2,6,6-tetramethylpiperidyl)-sebacate; bis-5 (1,2,2,6,6-pentamethylpiperidyl)-sebacate; n-butyl-3,5-di-tert-butyl-4-hydroxybenzyl malonic acid bis(1,2,2,6,6,-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone). These amines typically called HALS (Hindered Amines Light Stabilizing) include butane tetracarboxylic acid 2,2,6,6-tetramethyl piperidinol esters. Such amines include hydroxylamines derived from hindered amines, such as di(1-hydroxy-2,2,6,6-tetramethylpiperidin-4-yl) sebacate; 1-hydroxy 2,2,6,6-tetramethyl-4-benzoxypiperidine; 1-hydroxy-2,2,6,6-tetramethyl-4-(3,5-di-tert-butyl-4-hydroxy hydrocinnamoyloxy)-piperdine; and N-(1-hydroxy-2,2,6,6-tetramethyl-piperidin-4-yl)-epsiloncaprolactam.

3. Secondary Antioxidants 3.1 Phosphites and Phosphonites

For example, triphenyl phosphite; diphenylalkyl phosphates; phenyldialkyl phosphates; tris(nonyl-phenyl)phosphite; trilauryl phosphite; trioctadecyl phosphite; distearyl pentaerythritol diphosphite; tris(2,4-di-tert-butylphenyl) phosphite; diisodecyl pentaerythritol diphosphite; 2,4,6-tri-tert-butylphenyl-2-butyl-2-ethyl-1,3-propanediol phosphite; bis(2,4-di-tert-butylphenyl)pentaerythritol diphosphite tristearyl sorbitol triphosphite; and tetrakis(2,4-di-tert-butylphenyl)4,4'-biphenylene diphosphonite.

3.2 Hydroxylamines and Amine Oxides

For example, N,N-dibenzylhydroxylamine; N,N-diethylhydroxylamine; N,N-dioctylhydroxylamine; N,N-dilaurylhydroxylamine; N,N-ditetradecylhydroxylamine; N,N-dihexadecylhydroxylamine; N,N-dioctadecylhydroxylamine; N-hexadecyl-N-octadecylhydroxylamine; N-heptadecyl-N-octadecylhydroxylamine; and N,N-dialkylhydroxylamine derived from hydrogenated tallow amine. The analogous amine oxides are also suitable.

4. Slip Agents

For example, oleamide; erucamide; stearamide; and ehenamide.

5. Fillers, Antiblocks, and Reinforcing Agents

For example, calcium carbonate; diatomaceous earth; natural and synthetic silica; silicates; glass fibers; asbestos; talc; kaolin; mica; barium sulfate; metal oxides and hydroxides; carbon black; and graphite.

6. Miscellaneous Additives

For example, plasticizers; epoxidized vegetable oils, such as epoxidized soybean oils; lubricants; emulsifiers; pigments; optical brighteners; nucleating agents; flameproofing agents; anti-static agents; anti-fog agents; blowing agents; and thiosynergists, such as dilaurythiodipropionate or distearylthiodipropionate.

Typically, the extrudable polymer compositions of the present invention will be prepared by melt blending prior to final extrusion. There are several methods which could be used to produce the compositions of the present invention.

All the components may be dry blended in the required weight ratio in a suitable device such as a tumble blender. The resulting dry blend is then melted in suitable equipment such as an extruder. Alternatively, a masterbatch could be prepared with some of the polyolefin and the other ingredients. The masterbatch is then fed to an extruder and melt blended. In a third method the dry components of the blend may be metered directly into an extruder.

The extruder may be a twin or single screw extruder. If it is a twin screw extruder, it may be operated in a co-rotating mode (i.e., both screws turning in the same direction) or in a counter rotating mode (i.e., the screws rotate in opposite directions).

The specific conditions for operation of any extruder will differ from that of any other extruder. The variations between machines may usually be resolved by non-inventive testing. Typically, laboratory twin screw extruders will operate within the following envelope of conditions. The barrel will be heated to a temperature from about 180 to 210, preferably from 190 to 200° C. The screw speed will normally be from 50 to 150, preferably from 100 to 130 RPM's. As noted above the specific conditions for the operation of any specific extruder can readily be determined by one skilled in the art by non-inventive testing in view of the above envelope of conditions.

The extruder will typically extrude the polymer composition as strands which are then cooled and cut into pellets for subsequent use, typically film extrusion.

The extruder used for the final extrusion, producing a film of high surface quality, may also be a single or twin screw extruder. The die may be a slot die or it may be an annular die extruding a film of the polymer blend about a stable bubble of air. The film is collapsed after passing through a set of rollers (nip rolls).

Extruders for thermoplastic polyolefins and extrusion processes which employ these extrudes are well known to those skilled in the art. A typical extruder contains one (or two) flighted screws which rotate within a cylinder or "barrel". The polyolefin is sheared between the barrel and the screw by the stresses caused by the rotation of the screw. In addition, the barrel of the extruder may be heated. The shear and/or heat cause the plastic to melt and the action of the flighted screw transports it along the length of the extruder. The molten plastic extrudate is then forced through a die to form the desired plastic part.

EXAMPLES

A conventional blown film line (manufactured by Macro Engineering) was used in these examples. The polyethylene was melt extruded in a conventional extruder, then forced through a conventional annular die having a three inch diameter. The films were produced at a blow up ratio of 2.5:1 and the aiming point for film thickness was 1.5 mils.

A melt fracture study is typically carried out by first introducing a 'MF Start-up Resin' that is used to generate a film that exhibits severe melt fracture under the experimental conditions. This is then used as the benchmark as "100% melt fracture". Then, another resin is introduced that contains a PPA, with the time of addition to the hopper defined as time zero (t=0 min). Sample swatches are then collected every 10 minutes for 90-120 minutes, or until the melt fracture has completely cleared (0% melt fracture), defined as measuring the amount of melt fracture observed across the width of the film swatch. A variety of parameters can impact the time to clear melt fracture, most notably shear rates and melt temperatures, however, this protocol is a convenient method for measuring the relative performance of various PPA products. A better performing PPA would be one that eliminates melt fracture at rates faster than other PPA products. However, even the "better performing" PPA still takes time to reach a steady state condition where the film being produced is free from melt fracture. There is a desire to reduce this conditioning time because the film that is produced during the start-up phase (which contains melt fracture) is generally not suitable for sale as "prime" film. We have now discovered that the time to reach melt fracture free performance may be reduced by applying polyethylene glycol to the die before the polymer extrusion starts.

Example 1

In this example, the "control" experiment is conducted with a commercially available LLDPE that contains a conventional PPA. The LLDPE is prepared by the gas phase copolymerization of ethylene and hexene using a Zeigler Natta catalyst and has a melt index, $I_2$ of 0.80 grams per 10 minutes and a density of 0.922 g/cm$^3$. The LLDPE (referred to in these examples as LLDPE-1) contains 500 parts per million of this PPA. The PPA is a commercially available product that is reported to contain a fluoroelastomer (52%), and PEG (42%) with the remainder being minor additives such as talc, calcium carbonate, barium sulfate and antioxidants. The LLDPE (containing the PPA) is introduced at t=0, and the melt fracture is eliminated after about 50 minutes (See FIG. 1). It should be noted that under these conditions, most "commercial" PPA-containing resins will clear within 60 minutes, with 50% clearing times differing by +/−10-20 minutes.

Two experiments were conducted to determine whether pre-coating the die with PEG would allow for faster rates of melt fracture clearing. The PEG used in these experiments was a commercially available product sold under the trademark CARBOWAX® (grade name 3350, with a reported number average molecular weight of about 3350). 14.2 grams of this PEG was mixed with 150 ml of water and some of this was then applied to the extruder die (about 20 ml was applied).

For the first experiment, the conditions used were similar to those described above for the Control sample. However, before transitioning to the LLDPE-1 resin, the line was stopped, the die cleaned out, and the PEG/water directly applied to the hot die, and the line was re-started.

This experiment showed a substantial decrease in the time required to completely clear the melt fracture (cf. 50 min vs 20 min). While not wishing to be bound by theory, this indicates that the PEG-coated die greatly facilitates the subsequent coating of the PPA on the die surfaces.

For the second experiment, the film line was shutdown, the night prior using standard procedures. The die pin was pulled, and when cool, the above-described water/PEG was 'painted' on. The die was then left to dry overnight. The next morning, another coat of water/PEG was applied to the die pin before being re-assembled to start the film line. This experiment represents a practical scenario that might be experienced at a commercial blown film production facility that requires being shut down (e.g., for maintenance; or troubleshooting or on film lines that are not operated 24 hours per day). In this experiment, most of the melt fracture was eliminated at the 10-minute point, and it is almost completely cleared within about 20 minutes.

Figure 2:
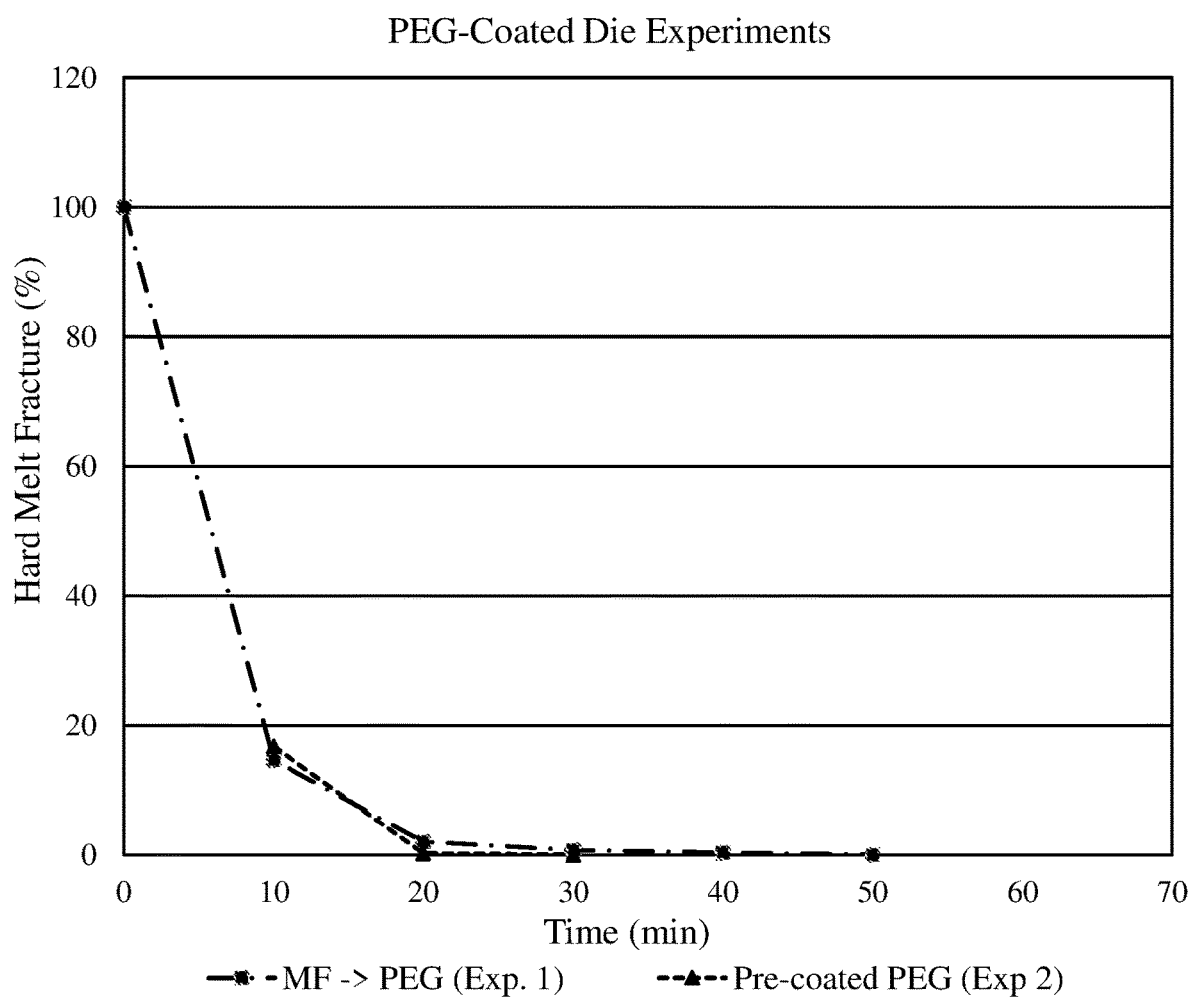
FIG. 2 shows melt fracture clearing charts for experiments 1 and 2 with LLDPE-1.

Data for the first experiment (Exp. 1) and the second experiment (Exp. 2) from this Example are plotted in FIG. 2.

Example 2

In this example, a different LLDPE was used. This LLDPE was an ethylene-butene copolymer, produced in a gas phase process with a ZN catalyst and had a melt index, $I_2$, of 0.80 grams per 10 minutes and a density of 0.921 g/cm$^3$. It also contained the same PPA used in the previous example and the PPA was present in the same amount (500 ppm). This LLDPE is referred to as LLDPE-2.

Figure 3:
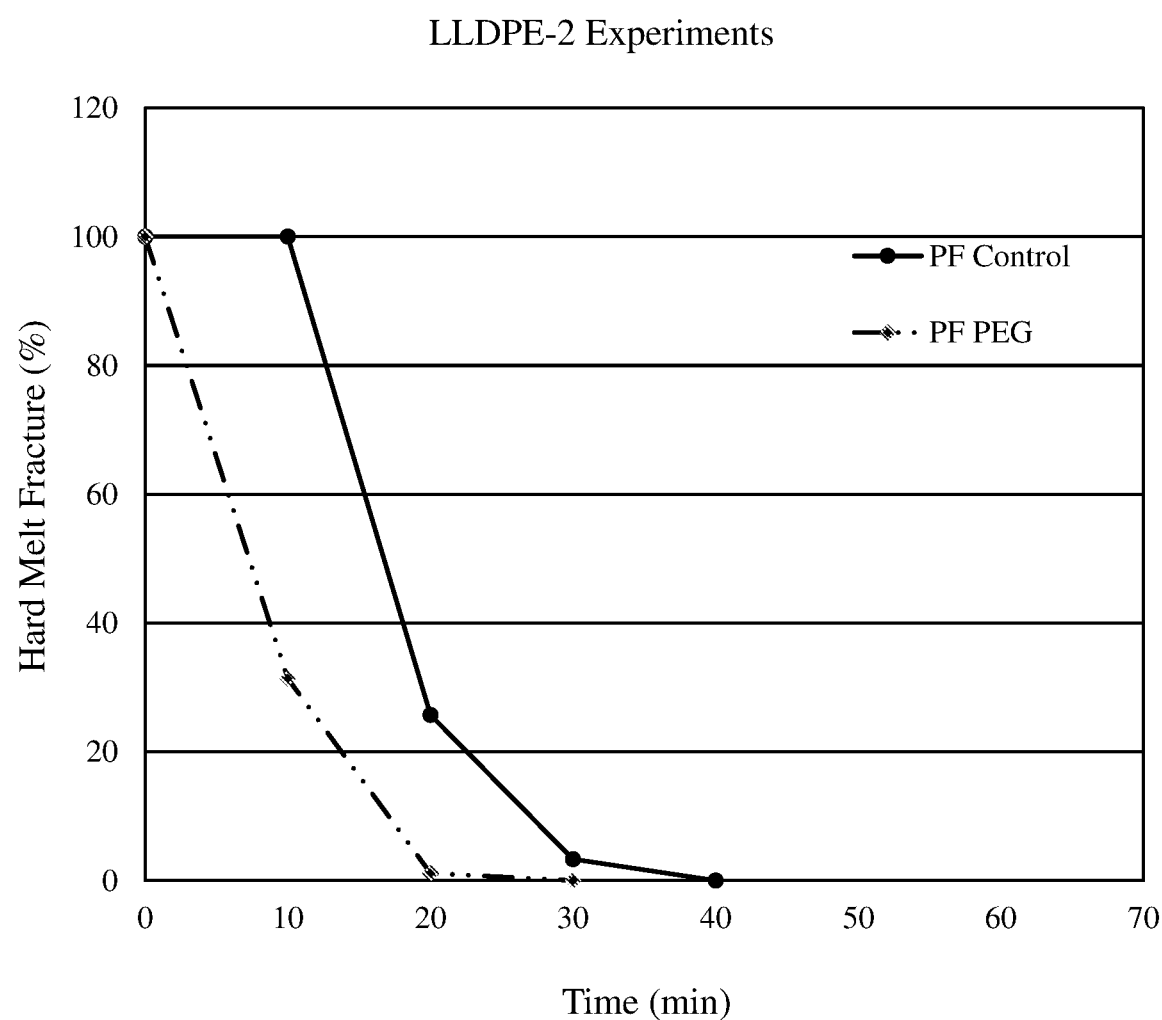
FIG. 3 shows melt fracture clearing charts for Control (LLDPE-2, without coated die) and LLDPE-2 with PEG-coated die.

The Control experiment is similar to that described above, where the line was setup using Melt Fracture Start-up resin, and then LLDPE-2 was introduced at t=0. The melt fracture underwent a substantial decrease after 10 minutes, and was nearly eliminated by 40 minutes (See FIG. 3).

In this inventive experiment, the PEG/water (described in example 1) was applied to the hot die, before the LLDPE-2 was extruded. In this experiment, the melt fracture was eliminated significantly faster than the Control sample. The melt fracture was eliminated by 20 minutes, a full 20 minutes faster than the Control sample (See FIG. 3).

INDUSTRIAL APPLICABILITY

Provided is a "start-up protocol" which reduces the time required for a polymer extrusion process to provide a "melt fracture free" polymer film.

The invention claimed is:

1. A method for the extrusion of a composition, the method comprising:
   an applying step consisting of applying a first polymer composition consisting of a polyethylene glycol having an average molecular weight of from 300 to 10,000 g/mol to an annular die;
   an extruding step comprising extruding a polyethylene composition in a blown film line comprising an extruder and the annular die;
   wherein the polyethylene composition comprises:
   a) a first polyethylene; and
   b) a polymer process aid comprising fluoropolymer; and
   wherein the applying of the first polymer composition to the annular die is performed prior to the extruding step.

2. The method of claim 1, wherein said polymer process aid comprises an interfacial agent and the fluoropolymer is a fluoroelastomer.

3. The method of claim 2, wherein said interfacial agent is a polyethylene glycol having an average molecular weight of from 3,000 to 10,000 g/mol.

4. The method of claim 1, wherein said first polyethylene has a melt index, $I_2$, as determined by ASTM D1238 at 190° C., using a 2.16 kilogram load, of from 0.3 to 5 grams per 10 minutes, and a density of from 0.900 to 0.935 g/cc.

5. The method of claim 4, wherein said first polyethylene is a copolymer of ethylene with at least one comonomer selected from the group consisting of butene, hexene, and octene.

6. The method of claim 1, wherein the polyethylene glycol has an average molecular weight of 3,500 g/mol.

\* \* \* \* \*